United States Patent
Taniguchi et al.

(10) Patent No.: US 9,365,000 B2
(45) Date of Patent: *Jun. 14, 2016

(54) TIRE PUNCTURE REPAIR KIT

(75) Inventors: Norio Taniguchi, Kobe (JP); Tsutomu Kono, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 175 days.

This patent is subject to a terminal disclaimer.

(21) Appl. No.: 14/239,928

(22) PCT Filed: Jul. 23, 2012

(86) PCT No.: PCT/JP2012/068585
§ 371 (c)(1),
(2), (4) Date: Feb. 20, 2014

(87) PCT Pub. No.: WO2013/042448
PCT Pub. Date: Mar. 28, 2013

(65) Prior Publication Data
US 2014/0190590 A1     Jul. 10, 2014

(51) Int. Cl.
 *B29C 73/02*   (2006.01)
 *B29C 73/16*   (2006.01)
 *B29L 30/00*   (2006.01)

(52) U.S. Cl.
CPC ............. *B29C 73/025* (2013.01); *B29C 73/166* (2013.01); *B29L 2030/00* (2013.01)

(58) Field of Classification Search
CPC .. B29C 73/025; B29C 73/166; B67D 7/0266; B67D 7/0294; B60C 29/062; B60C 25/16
USPC ............................ 141/38, 5, 67, 37, 105, 100; 222/394–402.25; 251/148–152
See application file for complete search history.

(56) References Cited

U.S. PATENT DOCUMENTS 2,017,145 A * 10/1935 Dunn .................. B05B 11/0059
                                                           222/401
3,175,591 A *  3/1965 Manas ...................... B67C 3/16
                                                           141/295

(Continued)

FOREIGN PATENT DOCUMENTS

DE    10 2010 010 361 A1     9/2011
EP         2 123 432 A1     11/2009

(Continued)

OTHER PUBLICATIONS

Extended European Search Report issued Apr. 1, 2015, in European Patent Application No. 12833654.2.

(Continued)

*Primary Examiner* — Timothy L Maust
*Assistant Examiner* — Randall Gruby
(74) *Attorney, Agent, or Firm* — Birch, Stewart, Kolasch & Birch, LLP

(57) ABSTRACT

The invention allows the relaxation of the precision of fitting the inner lid to the cap body while making removal of the inner lid more reliable. In the bottle unit of the tire puncture repair kit that has an extraction cap attached to the mouth portion of the bottle container, the extraction cap is provided with: a first flow channel for taking in compressed air from a compressor into the bottle container; a second flow channel for successively taking out the puncture repair liquid and compressed air from the bottle container; and first and second closing means for closing the first and second flow channels in the pre-coupling state. The extraction cap is provided with a release means for releasing the second closing means and opening the second flow channel when connection occurs.

19 Claims, 7 Drawing Sheets

(56) References Cited

U.S. PATENT DOCUMENTS

| | | | | |
|---|---|---|---|---|
| 4,535,918 | A * | 8/1985 | Heiligman | B67D 7/0266 222/185.1 |
| 5,058,636 | A * | 10/1991 | Simmel | B65B 39/04 141/290 |
| 5,186,224 | A * | 2/1993 | Schirmacher | B67D 7/0294 137/588 |
| 5,203,384 | A * | 4/1993 | Hansen | B67D 7/0478 141/105 |
| 6,019,145 | A * | 2/2000 | Savidge | G01M 1/323 141/100 |
| 8,020,588 | B2 * | 9/2011 | Wang | B29C 73/166 141/100 |
| 8,201,586 | B2 * | 6/2012 | Yoshida | B29C 73/166 141/105 |
| 8,596,310 | B2 * | 12/2013 | Senno | B29C 73/166 141/105 |
| 8,627,857 | B2 * | 1/2014 | Chou | B29C 73/166 141/38 |
| 8,684,046 | B2 * | 4/2014 | Kojima | B29C 73/166 141/38 |
| 2001/0045438 | A1 * | 11/2001 | Bilskie | B67D 1/0406 222/400.7 |
| 2003/0056851 | A1 * | 3/2003 | Eriksen | B29C 73/166 141/38 |
| 2004/0055664 | A1 * | 3/2004 | Horvath | B60K 15/04 141/98 |
| 2005/0211330 | A1 * | 9/2005 | Fleischman et al. | F16L 41/021 141/67 |
| 2005/0284536 | A1 | 12/2005 | Kojima et al. | |
| 2006/0217662 | A1 * | 9/2006 | Hickman | B29C 73/166 604/153 |
| 2009/0277534 | A1 * | 11/2009 | Yoshida | B29C 73/166 141/38 |
| 2010/0186849 | A1 * | 7/2010 | Yoshida | B29C 73/166 141/38 |
| 2011/0290372 | A1 * | 12/2011 | Dowel | B29C 73/166 141/37 |
| 2012/0000572 | A1 * | 1/2012 | Chou | B29C 73/166 141/38 |
| 2012/0000573 | A1 * | 1/2012 | Chou | B29C 73/166 141/38 |
| 2012/0138190 | A1 * | 6/2012 | Lawson | B60C 25/132 141/38 |
| 2013/0048146 | A1 | 2/2013 | Eckhardt | |
| 2013/0092286 | A1 * | 4/2013 | Chou | B60S 5/04 141/38 |
| 2013/0284313 | A1 * | 10/2013 | Kojima | B29C 73/166 141/38 |
| 2014/0091244 | A1 * | 4/2014 | Gricourt | B67D 7/0294 251/148 |
| 2014/0209208 | A1 * | 7/2014 | Taniguchi | B29C 73/166 141/38 |
| 2014/0224380 | A1 * | 8/2014 | Kono | B29C 73/166 141/37 |
| 2014/0224381 | A1 * | 8/2014 | Nakao | B29C 73/166 141/37 |
| 2014/0366981 | A1 * | 12/2014 | Taniguchi | B29C 73/166 141/38 |
| 2015/0013832 | A1 * | 1/2015 | Riggio | B67C 3/282 141/5 |
| 2015/0041020 | A1 * | 2/2015 | Marini | B29C 73/166 141/38 |
| 2015/0059920 | A1 * | 3/2015 | Takahara | B29C 73/166 141/5 |
| 2015/0059921 | A1 * | 3/2015 | Jhou | F04B 35/06 141/38 |
| 2015/0191339 | A1 * | 7/2015 | Perrier | B67C 3/262 141/5 |
| 2015/0197066 | A1 * | 7/2015 | Wong | B60S 5/04 141/38 |

FOREIGN PATENT DOCUMENTS

| | | | |
|---|---|---|---|
| JP | 2005-319615 A | 11/2005 | |
| JP | 2006-7660 A | 1/2006 | |
| JP | 2009-23123 A | 2/2009 | |
| JP | 2009-23225 A | 2/2009 | |
| JP | 2010-94944 A | 4/2010 | |
| WO | WO 2010123113 | * 10/2010 | B29C 73/166 |

OTHER PUBLICATIONS

International Search Report issued in PCT/JP2012/068585, dated Aug. 21, 2012.

* cited by examiner

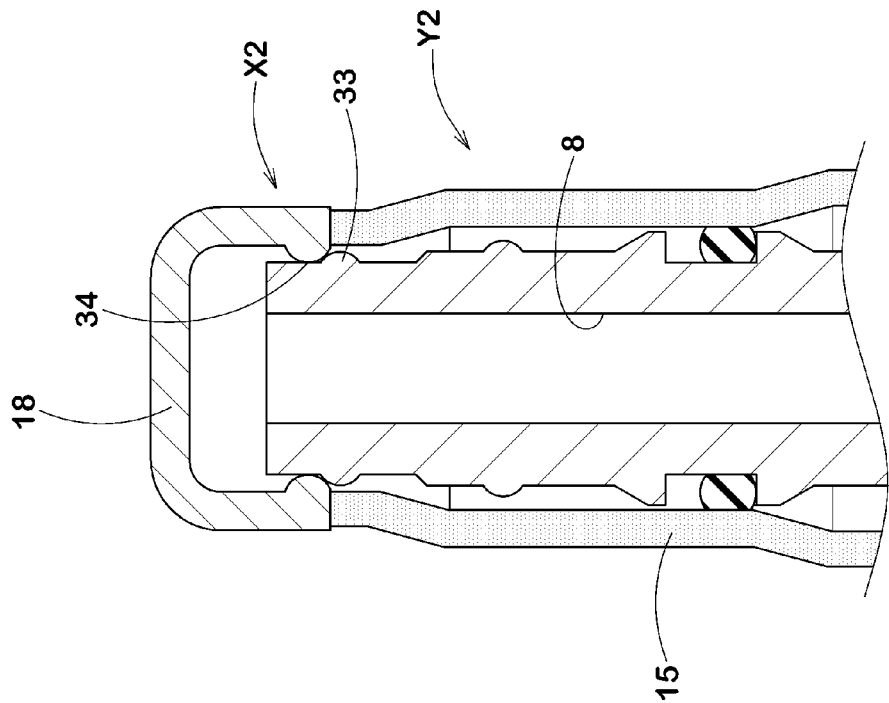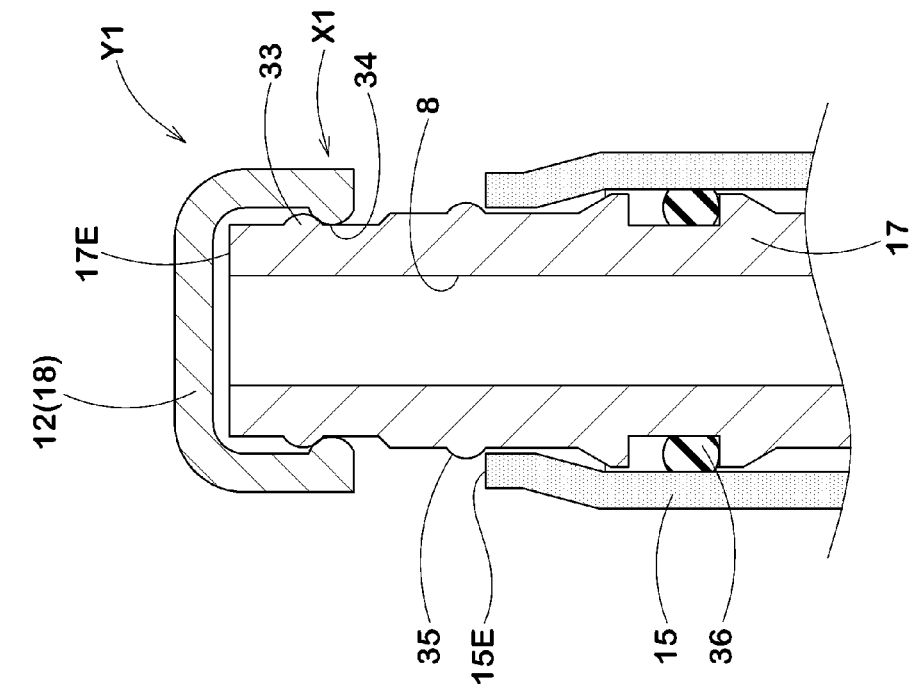

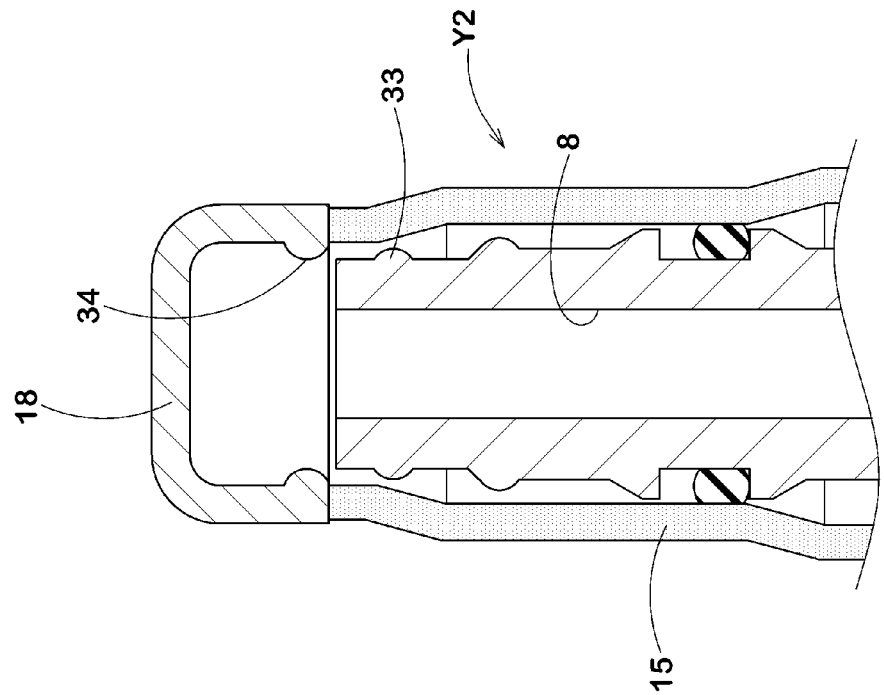
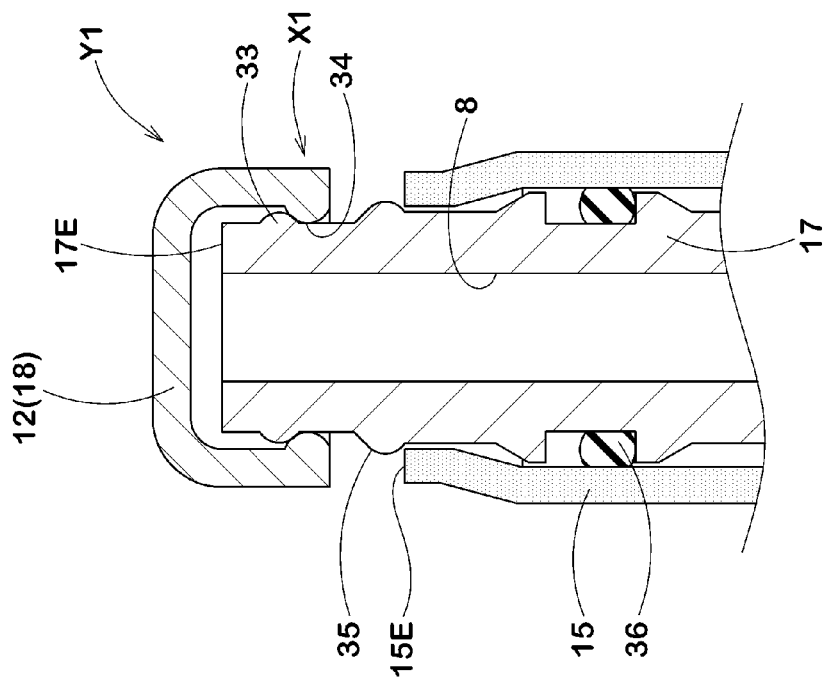
FIG.6A
FIG.6B

TIRE PUNCTURE REPAIR KIT

TECHNICAL FIELD OF THE INVENTION

The present invention relates to a tire puncture repair kit to sequentially charge a puncture repair liquid and compressed air into a punctured tire to temporarily repair the puncture.

BACKGROUND ART

For example, the following patent document 1 describes a bottle unit (c) for a ti re puncture repair kit including an extraction cap (b) attached to a mouth portion (a1) of a bottle container (a).

As shown in FIG. 7, the extraction cap (b) for use in the bottle unit (c) includes a cap body (g) and an inner lid (h). The cap body (g) includes a first flow channel (e) to take in the compressed air from a compressor (d) into the bottle container (a), and a second flow channel (f) to sequentially take out the puncture repair liquid and the compressed air from the bottle container (a) by an intake of the compressed air. The inner lid (h) is to simultaneously close the first and second flow channels (e) and (f).

Specifically, the cap body (g) includes a fitting recess portion (g1) to screw thereto the mouth portion (a1) of the bottle container (a), and a boss portion (g2) extending upward from a bottom surface of the fitting recess portion (g1). Upper opening portions (e1) and (f1) respectively for the first and second flow channels (e) and (f) are disposed on an upper surface of the boss portion (g2). The inner lid (h) integrally includes an inner lid body (ha) to fit to an outer peripheral surface of the boss portion (g2), and a plug shank portion (hb) to fit into the upper opening portion (f1).

The bottle unit (c), prior to use, is subjected to on-vehicle storage with the first and second flow channels (e) and (f) closed by the inner lid (h). At the time of a puncture repair, the extraction cap (b) in this state is to be piped to operate the compressor (d). This allows the compressed air to flow through the first flow channel (e) into the inner lid body (ha), and upon an increase in internal pressure therein, the inner lid (h) is to automatically come off to open the first and second flow channels (e) and (f).

Accordingly, the inner lid (h) does not need to come off during the storage, and needs to easily come off under the compressed air at the time of the puncture repair. It therefore becomes necessary to enhance precision in fitting dimension between the inner lid (h) and the cap body (g) to control with high precision an interlocking force between the inner lid (h) and the cap body (g).

However, according to the conventional structure, both the inner lid body (ha) and the plug shank portion (hb) are respectively subjected to fitting, and hence interlocking variations occur in both. Therefore, still higher precision is needed for the fitting dimension, thus causing a drop in yield rate and an increase in process costs for a product inspection process.

Additionally, the inner lid (h) needs simultaneous release in the fitting of the inner lid body (ha) and the fitting of the plug shank portion (hb). For example, when the plug shank portion (hb) is first about to come off to cause a gap, the compressed air in the inner lid body (ha) leaks from the gap to the second flow channel (f). Consequently, the internal pressure of the inner lid body (ha) stops increasing. On the other hand, when the inner lid body (ha) is first about to come off to cause a gap, the compressed air leaks from the gap into the bottle container (a). As a result, the pressure in the bottle container (a) increases, which reduces a pressure difference between the inside and outside of the inner lid body (ha).

Accordingly in either case, the inner lid (h) does not separate from the boss portion (g2). Thus, the inner lid body (ha) and the plug shank portion (hb) need to come off simultaneously, and this also contributes to the need for high precision.

RELATED ART DOCUMENTS

Patent Documents

Patent document 1: Japanese unexamined Patent Application Publication No. 2009-23123.

SUMMARY OF THE INVENTION

Problems to be Solved by the Invention

Accordingly, it is an object of the present invention to provide a puncture repair kit capable of relaxing the fitting precision between the inner lid and the cap body while ensuring separation of the inner lid, thereby capable of suppressing, for example, the drop in yield rate of the extraction cap and the increase in the process costs for the product inspection process.

Means for Solving the Problems

To achieve the above-mentioned object, the invention set forth in claim 1 of the present application characterized in that a puncture repair kit comprises: a compressor comprising a compressed air discharge port portion configured to discharge compressed air; a bottle unit comprising a bottle container configured to store a puncture repair liquid and an extraction cap attached to a mouth portion of the bottle; and coupling means for coupling the compressor and the extraction cap of the bottle unit with each other so as to be integrally secured to each other. The extraction cap comprises an inlet portion configured to take in the compressed air from the compressed air discharge port portion of the compressor through a first flow channel into the bottle container, an outlet portion configured to sequentially take out the puncture repair liquid and the compressed air from the bottle container through a second flow channel by an intake of the compressed air, and first and second closing means for respectively closing the first and second flow channels in a pre-coupling state attained by the coupling means. One of the compressed air discharge port portion and the inlet portion comprises a coupling nozzle extending toward another, and the another comprises a nozzle receiver configured to insert the coupling nozzle therein so as to be tightly coupled with the coupling nozzle in response to coupling attained by the coupling means. The extraction cap comprises release means configured to releasing the second closing means to open the second flow channel in response to the coupling attained by the coupling means.

In claim 2, the extraction cap comprises a cap body integrally comprising a barrel portion comprising an upper end, a lower end, and a tubular portion therebetween, the upper end configured to fit in the mouth portion of the bottle container, the lower end configured to include a bottom portion, the tubular portion comprising an inner hole communicating with an inside of the bottle container, and a blast pipe extending upward from the bottom portion and coaxially with the tubular portion, the blast pipe comprising a center hole serving as the first flow channel; and a sheath pipe externally inserted in and held on the blast pipe in a vertically slidable manner. And the second closing means is disposed in the sheath pipe so as to be integrally movable with the sheath pipe, and the inlet portion is extended downward on the bottom portion.

In claim 3, the release means comprises a projection piece for release extending from a lower end of the sheath pipe and protruding downward through the bottom portion, and the release means is configured to release the second closing means owing to a fact that the projection piece for release comes into contact with the compressor to push upward the sheath pipe in response to the coupling attained by the coupling means.

In claim 4, the second flow channel comprises an annular vertical flow channel portion defined by a gap between the sheath pipe and the tubular portion, and a lateral flow channel portion configured to communicate via an intersection P with the vertical flow channel portion and extend from the intersection P to a tip opening portion of the outlet portion. And the tubular portion comprises a large-diameter wall portion allowing the inner hole to define a large diameter, and a small-diameter wall portion configured to communicate via a step portion with a lower side of the large-diameter wall portion, and the large-diameter wall portion is defined at a higher position than the intersection P.

In claim 5, the second closing means comprises upper and lower seal members integrally movably disposed on the sheath pipe and configured to respectively come into contact with the small-diameter wall portion to close the vertical flow channel on a higher side and a lower side than the intersection P, and the upper seal member defines a gap between the upper seal member and the large-diameter wall portion to open the second flow channel when the upper seal member is moved upward beyond the step portion by an upward push against the sheath pipe.

In claim 6, an upper end of the blast pipe is located higher than a liquid surface of the puncture repair liquid.

In claim 7, the first closing means is an inner lid configured to fit to an upper end portion of the blast pipe to close the first flow channel, and the inner lid is configured to come off to open the first flow channel under internal pressure of the first flow channel generated by the compressed air from the compressor.

In claim 8, the blast pipe comprises a first locking projection projecting with a small height from an outer peripheral surface of the blast pipe at a position retreated from the upper end of the blast pipe, and the inner lid comprises an annular second locking projection projecting with a small height from an inner peripheral surface of the inner lid and extending in a circumferential direction, the second locking projection being climbable over the first locking projection. And in the pre-coupling state attained by the coupling means, the inner lid is configured to close the first flow channel in a first engaged state allowing the second locking projection to be engaged with the first locking projection on a lower side of the first locking projection.

In claim 9, the inner lid is configured to be pushed upward from the first engaged state via the sheath pipe in response to the coupling attained by the coupling means, and the inner lid is configured to close the first flow channel in a second engaged state allowing the second locking projection to be pinched and held by the outer peripheral surface of the blast pipe on a higher side than the first locking projection.

In claim 10, the first closing means is an inner lid configured to fit to the upper end portion of the blast pipe to close the first flow channel, and the inner lid is configured to be pushed upward via the sheath pipe to separate from the upper end portion and open the first flow channel in response to the coupling attained by the coupling means.

In claim 11, the blast pipe comprises a first locking projection projecting with a small height from the outer peripheral surface of the blast pipe, and the inner lid comprises an annular second locking projection projecting with a small height from an inner peripheral surface of the inner lid and extending in a circumferential direction, the second locking projection being climbable over the first locking projection. In the pre-coupling state attained by the coupling means, the inner lid is configured to close the first flow channel in a first engaged state allowing the second locking projection to be engaged with the first locking projection on a lower side of the first locking projection.

Effects of the Invention

The puncture repair kit of the present invention separately includes release means to release the second closing means in response to the coupling attained when the extraction cap is coupled with the compressor. This allows the first and second flow channels to be independently opened. It is therefore ensured to relax the fitting precision between the inner lid as the first closing means and the cap body. It is also ensured to suppress, for example, the drop in yield rate of the extraction cap and the increase in process costs for the product inspection process. It is also ensured to reliably prevent the occasion that the inner lid comes off to cause leak of the liquid during storage. It is also ensured to reliably prevent the occasion that at the time of use, the inner lid does not come off to make a puncture repair operation inoperable.

BRIEF DESCRIPTION OF THE DRAWINGS

FIGS. 5(A) and 5(B) are partial cross-sectional views illustrating in enlarged dimension first closing means in the pre-coupling state and in the coupled state;

FIGS. 6(A) and 6(B) are partial cross-sectional views illustrating in enlarged dimension first closing means according to other embodiment in the pre-coupling state and in the coupled state.

MODE FOR CARRYING OUT THE INVENTION

An embodiment of the present invention is described in detail below.

Figure 1:
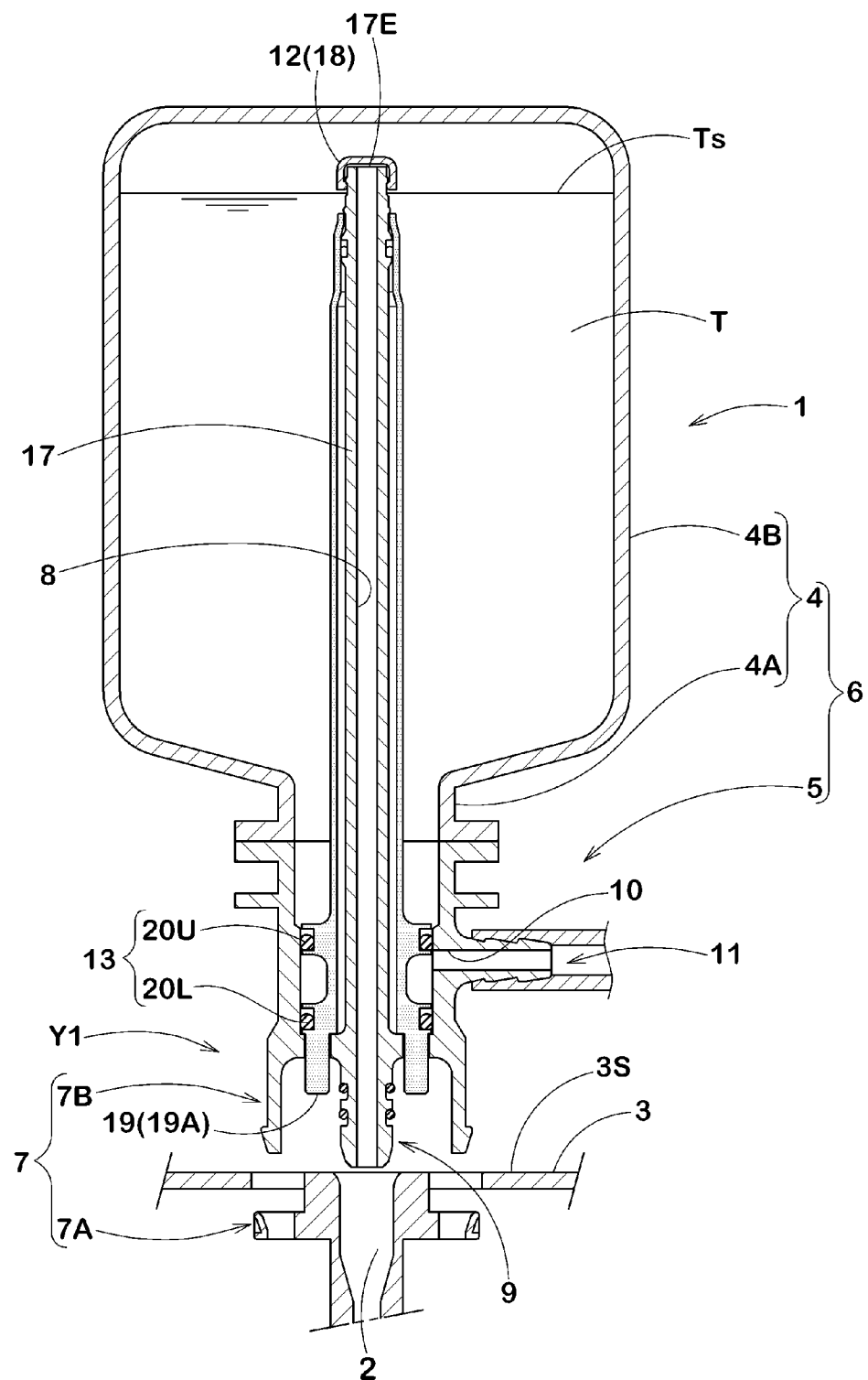
FIG. 1 is a cross-sectional view illustrating a pre-coupling state of a puncture repair kit of the present invention.

FIG. 1 illustrates a pre-coupling state Y1 of a puncture repair kit 1 of the present invention. The puncture repair kit 1 of the present embodiment includes a compressor 3, a bottle unit 6, and coupling means 7. The compressor 3 includes a compressed air discharge port portion 2 to discharge compressed air. The bottle unit 6 includes a bottle container 4 to store a puncture repair liquid T, and an extraction cap 5 to fit in a mouth portion 4A of the bottle container 4. The coupling means 7 is to couple the compressor 3 and the extraction cap 5 of the bottle unit 6 with each other so as to be integrally secured to each other.

The coupling means 7 includes a compressor side coupling portion 7A defined on the compressor 3, and an extraction cap side coupling portion 7B defined on the extraction cap 5. At the time of a puncture repair, these two portions 7A and 7B are coupled with each other at a puncture repair site, thereby allowing the compressor 3 and the bottle unit 6 to be integrally secured to each other. This prevents the bottle unit 6 from falling down during a puncture repair operation.

The compressor 3 includes a movable portion with a known structure using, for example, a motor, a piston, and a cylinder. In the present embodiment, the compressed air discharge port portion 2 and the compressor side coupling portion 7A are disposed on an upper surface 3S of the compressor 3.

Next, the bottle unit 6 includes the bottle container 4 and the extraction cap 5. The bottle container 4 includes a container portion 4B to store the puncture repair liquid T, and a small-diameter cylindrical-shaped mouth portion 4A extending upward from a lower end of the container portion 4B.

The extraction cap 5 includes an inlet portion 9, an outlet portion 11, and first and second closing means 12 and 13. The inlet portion 9 is to be coupled with the compressor 3 to take in the compressed air from the compressor 3. The compressed air thus taken in flows into the bottle container 4 through a first flow channel 8 being continuous with the inlet portion 9. The intake of the compressed air allows the puncture repair liquid and the compressed air to be sequentially taken out of the bottle container 4 through a second flow channel 10. The first and second closing means 12 and 13 are respectively to close the first and second flow channels 8 and 10 in the pre-coupling state Y1 attained by the coupling means 7. The extraction cap 5 also includes release means 19 to release the second closing means 13 to open the second flow channel 10 in response to the coupling attained by the coupling means 7.

Figure 2:
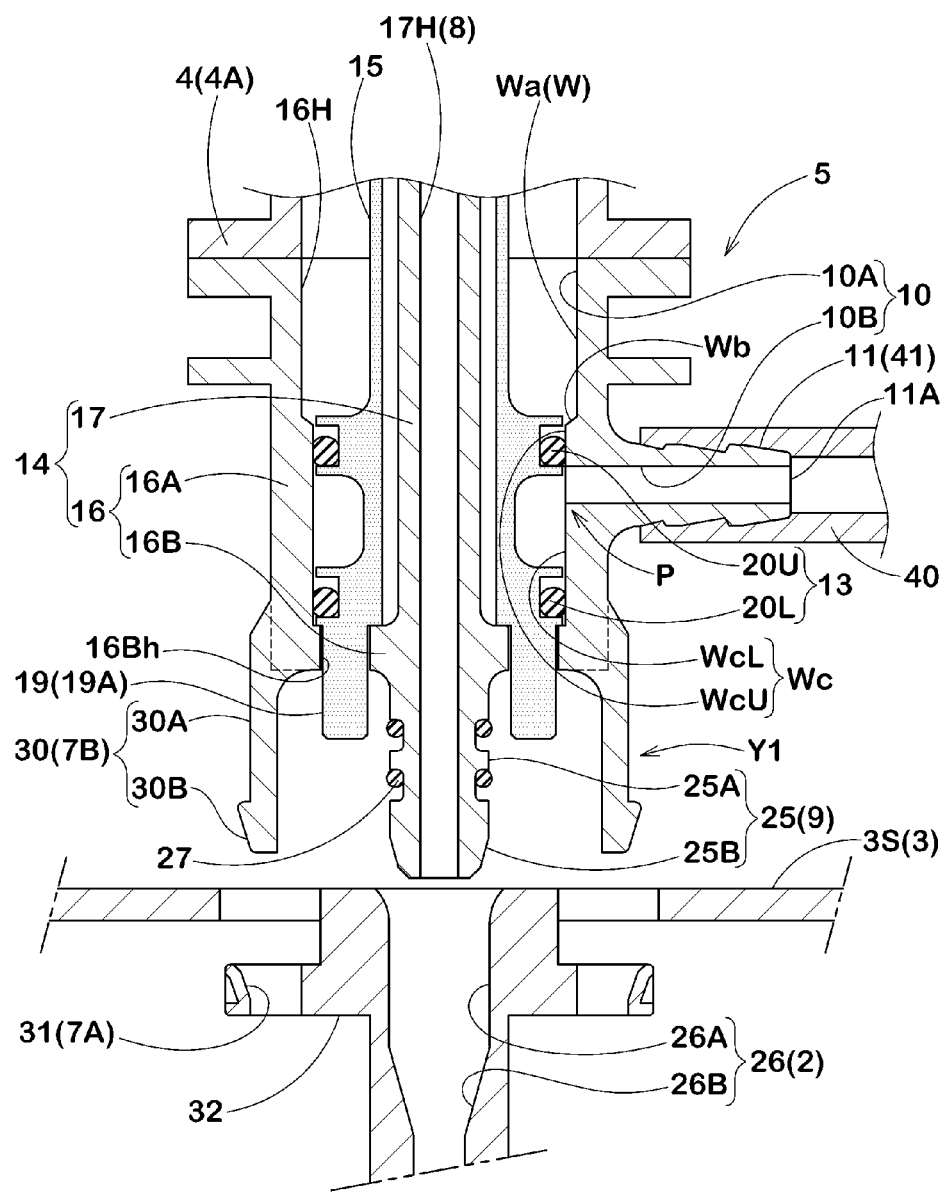
FIG. 2 is a partial cross-sectional view illustrating in enlarged dimension a main part of the puncture repair kit.
Figure 3:
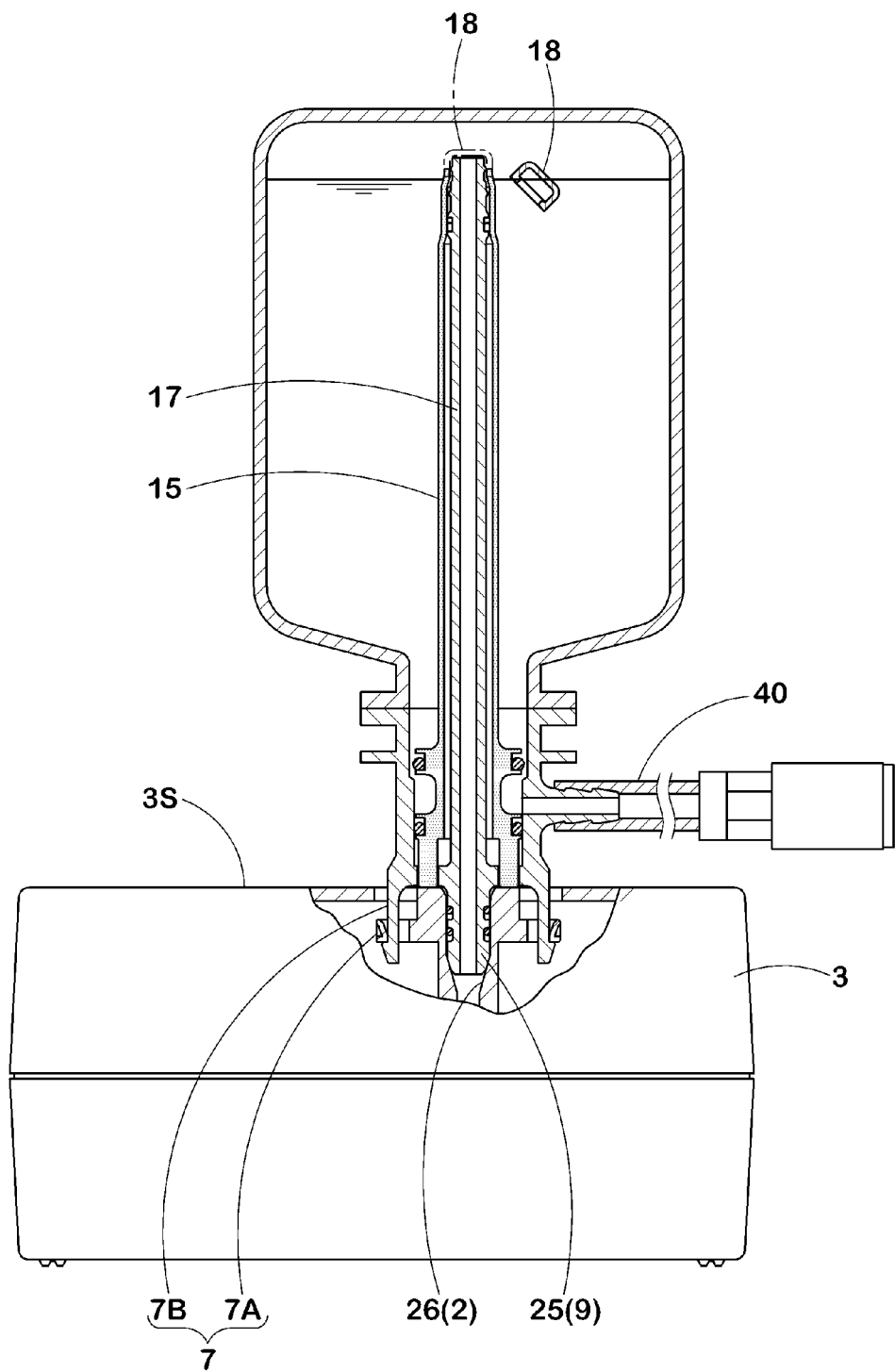
FIG. 3 is a cross-sectional view illustrating a coupled state of the puncture repair kit.

Specifically, the extraction cap 5 of the present embodiment is configured including a cap body 14 and a sheath pipe 15 as illustrated in enlarged dimension in FIG. 2. The cap body 14 integrally includes a barrel portion 16 and a blast pipe 17. The barrel portion 16 includes a tubular portion 16A whose upper end is to be air-tightly attached to the mouth portion 4A of the bottle container 4, and a bottom portion 16B joining (closing) a lower end of the tubular portion 16A. The blast pipe 17 extends upward from the bottom portion 16B. An inner hole 16H of the tubular portion 16A communicates with the inside of the bottle container 4.

The present embodiment illustrates the case where the mouth portion 4A and the tubular portion 16A are secured to each other by deposition. However, various methods are usable. That is, both may be secured to each other using, for example, adhesive. Alternatively, both may be secured to each other by screwing.

The blast pipe 17 extends upward and coaxially with the tubular portion 16A, and a center hole 17H of the blast pipe 17 constitutes the first flow channel 8. An inner lid 18 (shown in FIG. 1) to close the first flow channel 8 is capped on an upper end of the blast pipe 17. That is, the inner lid 18 constitutes the first closing means 12. In the present embodiment, the inner lid 18 is to automatically come off to open the first flow channel 8 under internal pressure of the first flow channel 8 generated by the compressed air from the compressor 3. An upper end 17E of the blast pipe 17 is terminated at a higher position than a liquid surface Ts of the puncture repair liquid T.

The sheath pipe 15 is extrapolated on the blast pipe 17 so as to be slidable up and down. In the present embodiment, the sheath pipe 15 includes the second closing means 13 to close the second flow channel 10, and the release means 19 to release the second closing means 13.

The release means 19 includes a projection piece for release 19A extending from a lower end of the sheath pipe 15 and extending downward through the bottom portion 16B. A through hole 16Bh to allow the projection piece for release 19A to pass therethrough is drilled through the bottom portion 16B. In the present embodiment, the projection piece for release 19A is to come into contact with an upper surface of a nozzle receiver 26 to push upward the sheath pipe 15 in response to the coupling attained by the coupling means 7. In the present embodiment, the upper surface of the nozzle receiver 26 is flush with an upper surface 3S of the compressor 3.

Here, the second flow channel 10 includes an annular vertical flow channel portion 10A and a lateral flow channel portion 10B. The vertical flow channel portion 10A is defined by a gap between the sheath pipe 15 and the tubular portion 16A. The lateral flow channel portion 10B is to communicate via an intersection P with the vertical flow channel portion 10A, and also extends laterally from the intersection P to a tip opening portion 11A of the outlet portion 11. The outlet portion 11 extends outward from the tubular portion 16A. In the present embodiment, the outlet portion 11 is defined as a coupling portion 41 of a hose 40 to inject the puncture repair liquid T and the compressed air to a tire.

An inner wall surface W of the tubular portion 16A includes a large-diameter wall portion Wa allowing the inner hole 16H to define a large diameter, and a small-diameter wall portion we to communicate via a step portion Wb with a lower side of the large-diameter wall portion Wa. The large-diameter wall portion Wa is defined at a higher position than the intersection P. Therefore, the small-diameter wall portion we is divided into an upper small-diameter wall portion WcU between the step portion Wb and the intersection P, and a lower small-diameter wall portion WcL on a lower side than the intersection P.

The second closing means 13 includes upper and lower ring-shaped seal members 20U and 20L disposed integrally movably on the sheath pipe 15. The upper and lower ring-shaped seal members 20U and 20L are respectively to come into contact with the small-diameter wall portion we to close the vertical flow channel portion 10A on a higher side and a lower side than the intersection P. The seal members 20U and 20L of the present embodiment are respectively so-called O-rings and held by circumferential grooves defined on an outer periphery of the sheath pipe 15.

Figure 4:
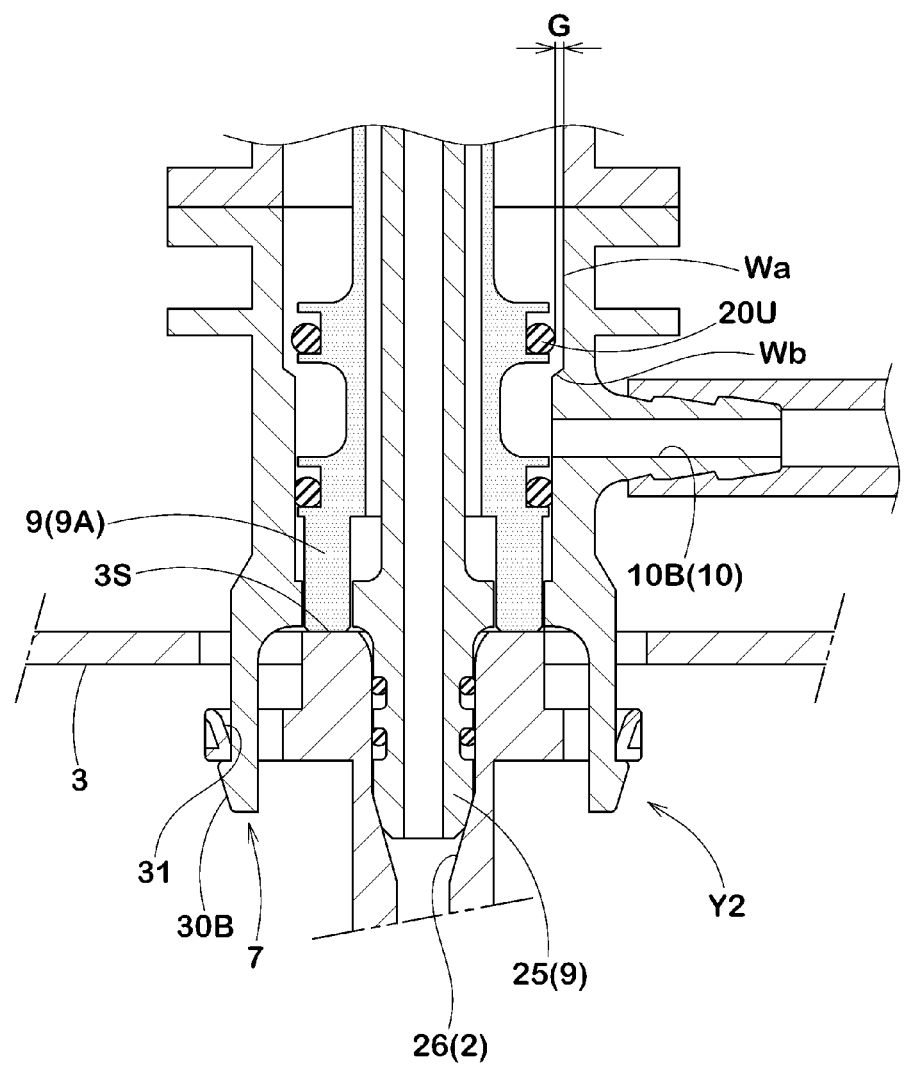
FIG. 4 is another partial cross-sectional view illustrating in enlarged dimension the main part of the puncture repair kit.
Figure 7:
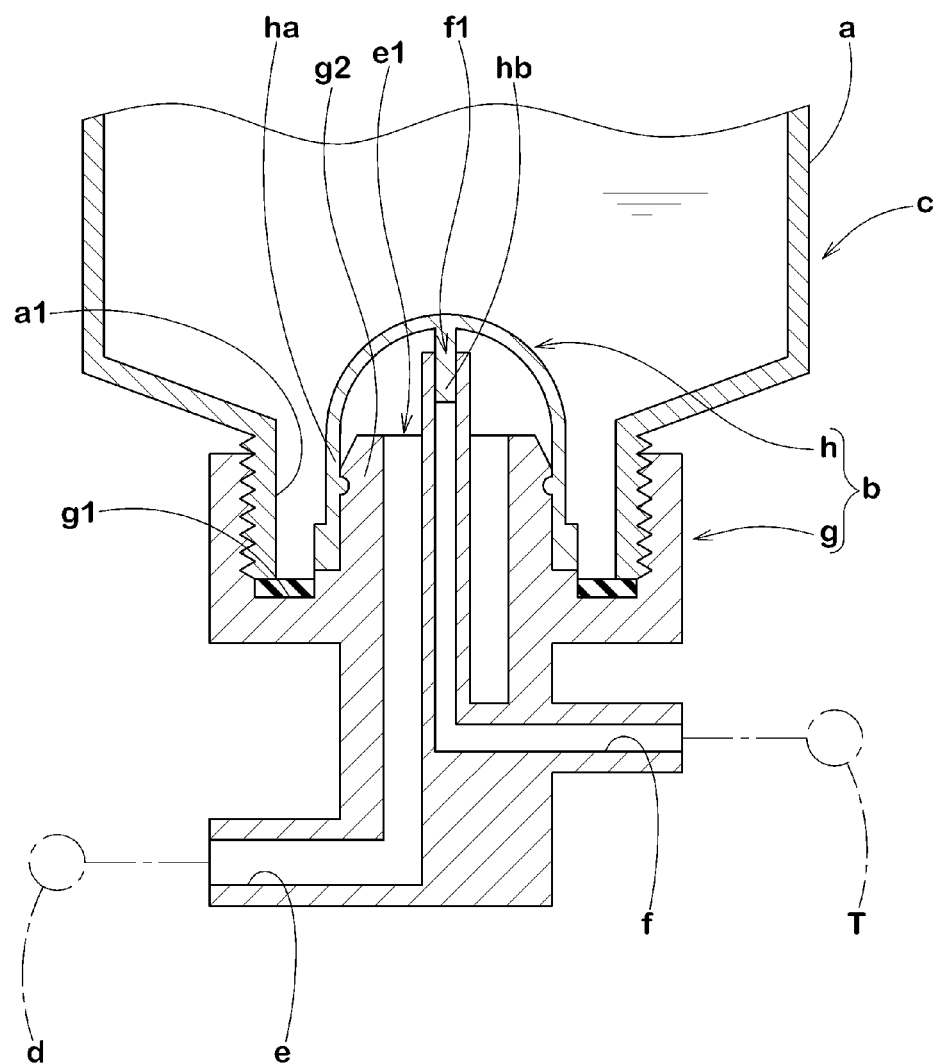
FIG. 7 is a cross-sectional view illustrating a conventional extraction cap.

In the second closing member 13, the upper seal member 20U is to come into contact with the upper small-diameter wall portion WcU in the pre-coupling state Y1 (shown in FIG. 2). Consequently, the second flow channel 10 is closed to prevent the puncture repair liquid T from flowing out to the outlet portion 11. In a coupled state Y2 (shown in FIG. 4), the upper seal member 20U is to move upward beyond the step portion Wb by an upward push against the sheath pipe 15 applied by the projection piece for release 19A. At this time, a gap G is defined between the upper seal member 20U and the large-diameter wall portion Wa, and consequently the second flow channel 10 is opened.

The barrel portion 16 includes the inlet portion 9 defined in the bottom portion 16B. The inlet portion 9 is to be directly coupled with the compressed air discharge port portion 2 of the compressor 3 without through a hose or the like.

Specifically, one of the compressed air discharge port portion 2 and the inlet portion 9 includes a coupling nozzle 25 extending toward the other. The other includes the nozzle receiver 26 to insert the coupling nozzle 25 therein to be tightly coupled with the coupling nozzle 25 in response to the coupling attained by the coupling means 7. The present embodiment illustrates the case where the inlet portion 9 is defined as the coupling nozzle 25 extending downward from the bottom portion 16B, and the compressed air discharge port portion 2 is defined as the nozzle receiver 26.

The coupling nozzle 25 includes a tapered cone shaped tapered surface portion 25B on a lower end side of a nozzle body 25A with a constant outer diameter. For example, two seal rings 27, such as O rings, are attached to the nozzle body 25A. The nozzle receiver 26 includes a tapered surface portion 26B having an approximately identical inclination to the tapered surface portion 25B at a lower end of a fitting hole portion 26A to be air-tightly fitted via the seal ring 27 to the nozzle body 25A. The coupling nozzle 25 and the nozzle receiver 26 are coaxially aligned with each other by these tapered surface portions 25B and 26B.

The coupling means 7 also includes the compressor side coupling portion 7A and the extraction cap side coupling portion 7B as described above. In the present embodiment, the extraction cap side coupling portion 7B includes a plurality of, for example, two locking claws 30 extending downward from the bottom portion 16B. Each of the locking claws 30 includes an approximately right-angled triangle shaped hook portion 30B projecting outward at a front end of a main portion 30A being continuous with the bottom portion 16B. On the other hand, the compressor side coupling portion 7A includes a claw engaging hole 31 to engage and lock in the hook portion 30B. In the present embodiment, the claw engaging hole 31 is defined in a frame 32 defined integrally with the nozzle receiver 26.

As shown in FIGS. 5(A) and 5(B), the blast pipe 17 of the present embodiment includes a first locking projection 33 projecting with a small height from an outer peripheral surface of the blast pipe 17 at a position retracted from the upper end 17E of the blast pipe 17. The inner lid 18 includes on its inner peripheral surface an annular second locking projection 34 projecting with a small height and extending in a circumferential direction. The second locking projection 34 is defined as being climbable over the first locking projection 33. In the pre-coupling state Y1 attained by the coupling means 7, the inner lid 18 is to close the upper end of the first flow channel 8 in a first engaged state X1. In the first engaged state X1, the second locking projection 34 is to engage with the first locking projection 33 on a lower side of the first locking projection 33.

In the pre-coupling state Y1, an upper end 15E of the sheath pipe 15 is located lower than the inner lid 18 in the first engaged state X1. A third locking projection 35 is defined at this location on the outer periphery of the blast pipe 17. Consequently, an upper end position of the sheath pipe 15 is regulated by the third locking projection 35 to prevent the sheath pipe 15 from coming into contact with the inner lid 18 in the pre-coupling state Y1. A seal ring 36, such as an O-ring, to seal between the blast pipe 17 and the sheath pipe 15, is attached to the blast pipe 17.

On the other hand, in the coupled state Y2, the inner lid 18 is to be pushed upward from the first engaged state X1 via the sheath pipe 15 as shown in FIG. 5(B). Then, the second locking projection 34 is to close the upper end of the first flow channel 8 in a second engaged state X2 lying on a higher side than the first locking projection 33. A shift from the first engaged state X1 to the second engaged state X2 is performable owing to the fact that the second locking projection 34 climbs over the first locking projection 33. In the second engaged state X2, the inner lid 18 is held only owing to the fact that the second locking projection 34 pinches the outer peripheral surface of the blast pipe 17. Therefore, the easy, reliable separation is attainable under the internal pressure of the first flow channel 8 generated by the compressed air. On the other hand, in the first engaged state X1, the second locking projection 34 is to engage with the first locking projection 33 to ensure a strong attachment.

Thus, the puncture repair kit 1 of the present embodiment allows the unstable bottle unit 6 including the coupling means 7 to be integrally coupled with and secured to the compressor 3. It is therefore ensured to prevent the falling of the bottle unit 6 during the puncture repair operation. Additionally, the compressor air discharge port portion 2 of the compressor 3 and the inlet portion 9 of the extraction cap 5 are directly coupled with each other. This eliminates the need for a hose on an air supply side and thus facilitates a piping operation at the puncture repair site and prevents mispiping.

The release means 19 to release the second closing means 13 is separately disposed to individually open the first and second flow channels 8 and 10. Therefore, only variations in fitting between the inner lid 18 as the first closing means 12 and the blast pipe 17 needs consideration. That is, it is ensured to reduce the variations in fitting by half than that in conventional one. It is also ensured to relax the fitting precision to suppress the drop in yield rate of the extraction cap and the increase in process costs for the product inspection process. Particularly, according to the present embodiment, the first and second locking projections 33 and 34 are disposed to attach, in the pre-coupling state Y1, the inner lid 18 in the strong first engaged state X1. Hence, the liquid leakage during storage can be reliably prevented. In the coupled state Y2, the inner lid 18 is to enter the weak second engaged state X2. Hence, the inner lid 18 can be easily and reliably separated under air pressure of the compressed air during the puncture repair. Additionally, the first and second engaged states X1 and X2 are switched in conjunction with the coupling attained by the coupling means 7, thus achieving reliable performance.

The sheath pipe 15 is externally inserted in and held on the blast pipe 17 serving as the first flow channel 8, and the second closing means 13 and the release means 19 are disposed on the sheath pipe 15. Consequently, the shift from the first engaged state X1 to the second engaged state X2, and the release of the second closing means 13 (the opening of the second flow channel 10) are reliably operable in conjunction with the coupling attained by the coupling means 7.

The upper end 17E of the blast pipe 17 is preferably located higher than the liquid surface Ts of the puncture repair liquid T, as in the present embodiment. The reason for this is that if the compressor 3 is operated with the second flow channel 10 side closed, the pressure in the bottle container 4 is abnormally enhanced. When the compressor 3 is subjected to pulsation, there occurs a risk that the puncture repair liquid T in the bottle container 4 flows back toward the compressor 3. In this regard, the above trouble is preventable by locating the upper end 17E higher than the liquid surface Ts. The state that the second flow channel 10 side is closed can correspond to, for example, the case where the inner lid 18 does not come off due to a defect of the second closing means 13, the case where the hose 40 to be coupled with the outlet portion 11 is bent and blocked, or the case where the tip of the hose 40 is blocked by the cap.

FIGS. 6(A) and 6(B) respectively illustrate other embodiment of the extraction cap 5. In the present embodiment, the distance between the first and third locking projections 33 and 35 is short. Consequently, in the pre-coupling state Y1, the lower end of the inner lid 18 and the upper end 15E of the sheath pipe 15 are close to each other. Therefore, as shown in FIG. 6(B), during the coupling by the coupling means 7, the inner lid 18 is pushed upward via the sheath pipe 15, and is separated from the upper end portion of the blast pipe 17 to open the first flow channel 8.

While the particularly preferable embodiments of the present invention have been described in detail, the present invention is not limited to the illustrated embodiments, but can be modified and carried out in various aspects.

DESCRIPTION OF THE REFERENCE NUMERAL

1 Puncture repair kit
2 Compressed air discharge port portion
3 compressor
4 Bottle container
4A mouth portion
5 Extraction cap
6 Bottle unit
7 Coupling means
8 First flow channel
9 Inlet portion
10 second flow channel
10A vertical flow channel portion
10B Lateral flow channel portion
11 Outlet portion
11A Tip opening portion
12 First closing means
13 second closing means
14 Cap body
15 Sheath pipe
16 Barrel portion
16A Tubular portion
16B Bottom portion
16H Inner hole
17 Blast pipe
17H Center hole
18 Inner lid
19 Release means
19A Projection piece for release
20U Upper seal member
20L Lower seal member
25 Coupling nozzle
26 Nozzle receiver
33 First locking projection
34 Second locking projection
T Puncture repair liquid
Ts Liquid surface
X1 First engaged state
X2 Second engaged state
Y1 Pre-coupling state
Y2 coupled state
Wa Large-diameter wall portion
Wb Step portion
Wc Small-diameter wall portion

The invention claimed is:

1. A puncture repair kit comprising:
a compressor comprising a compressed air discharge port portion configured to discharge compressed air;
a bottle unit comprising a bottle container configured to store a puncture repair liquid and an extraction cap attached to a mouth portion of the bottle container; and
coupling means for coupling the compressor and the extraction cap of the bottle unit with each other so as to be integrally secured to each other,
wherein the extraction cap comprises an inlet portion configured to take in the compressed air from the compressed air discharge port portion of the compressor through a first flow channel into the bottle container, an outlet portion configured to sequentially take out the puncture repair liquid and the compressed air from the bottle container through a second flow channel by an intake of the compressed air, and first and second closing means for respectively closing the first and second flow channels in a pre-coupling state attained by the coupling means,
wherein the inlet portion comprises a coupling nozzle extending toward the compressed air discharge port portion comprising a nozzle receiver configured to insert the coupling nozzle therein so as to be tightly coupled with the coupling nozzle in response to coupling attained by the coupling means,
wherein the extraction cap comprises release means configured to release the second closing means to open the second flow channel in response to the coupling attained by the coupling means,
wherein the extraction cap comprises:
a cap body integrally comprising a barrel portion comprising an upper end of a barrel portion, a lower end of a barrel portion, and a tubular portion therebetween, the upper end configured to attach to the mouth portion of the bottle container, the lower end configured to include a bottom portion, the tubular portion comprising an inner hole communicating with an inside of the bottle container, and a blast pipe extending upward from the bottom portion and coaxially with the tubular portion, the blast pipe comprising a center hole serving as the first flow channel, and
a sheath pipe externally inserted in and held on the blast pipe in a vertically slidable manner, and
wherein the second closing means is disposed in the sheath pipe so as to be integrally movable with the sheath pipe, and the inlet portion is extended downward from the bottom portion.

2. The puncture repair kit according to claim 1, wherein the release means comprises a projection piece for release extending from a lower end of the sheath pipe and protruding downward through the bottom portion, and the release means is configured to release the second closing means owing to a fact that the projection piece for release comes into contact with the compressor to push upward the sheath pipe in response to the coupling attained by the coupling means.

3. The puncture repair kit according to claim 2,
wherein the second flow channel comprises an annular vertical flow channel portion defined by a gap between the sheath pipe and the tubular portion, and a lateral flow channel portion configured to communicate via an intersection with the vertical flow channel portion and extend from the intersection to a tip opening portion of the outlet portion, and
wherein the tubular portion comprises a large-diameter wall portion allowing the inner hole to define a large diameter, and a small-diameter wall portion configured to communicate via a step portion with a lower side of the large-diameter wall portion, and the large-diameter wall portion is defined at a higher position than the intersection.

4. The puncture repair kit according to claim 3, wherein an upper end of the blast pipe is located higher than a liquid surface of the puncture repair liquid.

5. The puncture repair kit according to claim 2, wherein the first closing means is an inner lid configured to attach to an upper end portion of the blast pipe which closes the first flow channel, wherein the inner lid is further configured to open the first flow channel by detaching from the blast pipe due to internal pressure of the first flow channel generated by the compressed air from the compressor.

6. The puncture repair kit according to claim 2, wherein the first closing means is an inner lid configured to attach to the upper end portion of the blast pipe which closes the first flow channel, wherein the inner lid is further configured to open the first flow channel by detaching from the blast pipe due to upthrust with the sheath pipe in response to the coupling attained by the coupling means.

7. The puncture repair kit according to claim 1,
wherein the second flow channel comprises an annular vertical flow channel portion defined by a gap between the sheath pipe and the tubular portion, and a lateral flow channel portion configured to communicate via an intersection with the vertical flow channel portion and extend from the intersection to a tip opening portion of the outlet portion, and
wherein the tubular portion comprises a large-diameter wall portion allowing the inner hole to define a large diameter, and a small-diameter wall portion configured to communicate via a step portion with a lower side of the large-diameter wall portion, and the large-diameter wall portion is defined at a higher position than the intersection.

8. The puncture repair kit according to claim 7, wherein the second closing means comprises upper and lower seal members integrally movably disposed on the sheath pipe and configured to respectively come into contact with the small-diameter wall portion to close the vertical flow channel on a higher side and a lower side than the intersection, and the upper seal member defines a boundary of a gap between the upper seal member and the large-diameter wall portion to open the second flow channel when the upper seal member is moved upward beyond the step portion by an upward push against the sheath pipe.

9. The puncture repair kit according to claim 8, wherein an upper end of the blast pipe is located higher than a liquid surface of the puncture repair liquid.

10. The puncture repair kit according to claim 8, wherein the first closing means is an inner lid configured to attach to an upper end portion of the blast pipe which closes the first flow channel, wherein the inner lid is further configured to open the first flow channel by detaching from the blast pipe due to internal pressure of the first flow channel generated by the compressed air from the compressor.

11. The puncture repair kit according to claim 7, wherein an upper end of the blast pipe is located higher than a liquid surface of the puncture repair liquid.

12. The puncture repair kit according to claim 7, wherein the first closing means is an inner lid configured to attach to an upper end portion of the blast pipe which closes the first flow channel, wherein the inner lid further is configured to open the first flow channel by detaching from the blast pipe due to internal pressure of the first flow channel generated by the compressed air from the compressor.

13. The puncture repair kit according to claim 1, wherein an upper end of the blast pipe is located higher than a liquid surface of the puncture repair liquid.

14. The puncture repair kit according to claim 13, wherein the first closing means is an inner lid configured to attach to an upper end portion of the blast pipe which closes the first flow channel, wherein the inner lid is further configured to open the first flow channel by detaching from the blast pipe due to internal pressure of the first flow channel generated by the compressed air from the compressor.

15. The puncture repair kit according to claim 1, wherein the first closing means is an inner lid configured to attach to an upper end portion of the blast pipe which closes the first flow channel, wherein the inner lid is further configured to open the first flow channel by detaching from the blast pipe due to under internal pressure of the first flow channel generated by the compressed air from the compressor.

16. The puncture repair kit according to claim 15,
wherein the blast pipe comprises a first locking projection projecting with a small height from an outer peripheral surface of the blast pipe at a position retreated from the upper end of the blast pipe, and the inner lid comprises an annular second locking projection projecting with a small height from an inner peripheral surface of the inner lid and extending in a circumferential direction, the second locking projection being climbable over the first locking projection, and
wherein in the pre-coupling state attained by the coupling means, the inner lid is configured to close the first flow channel in a first engaged state allowing the second locking projection to be engaged with the first locking projection on a lower side of the first locking projection.

17. The puncture repair kit according to claim 16, wherein the inner lid is configured to be pushed upward from the first engaged state via the sheath pipe in response to the coupling attained by the coupling means, and the inner lid is configured to close the first flow channel in a second engaged state allowing the second locking projection to be pinched and held by the outer peripheral surface of the blast pipe on a higher side than the first locking projection.

18. The puncture repair kit according to claim 1, wherein the first closing means is an inner lid configured to attach to the upper end portion of the blast pipe which closes the first flow channel, wherein the inner lid is further configured to open the first flow channel by detaching from the blast pipe due to upthrust with the sheath pipe in response to the coupling attained by the coupling means.

19. The puncture repair kit according to claim 18,
wherein the blast pipe comprises a first locking projection projecting with a small height from the outer peripheral surface of the blast pipe, and the inner lid comprises an annular second locking projection projecting with a small height from an inner peripheral surface of the inner lid and extending in a circumferential direction, the second locking projection being climbable over the first locking projection, and
wherein in the pre-coupling state attained by the coupling means, the inner lid is configured to close the first flow channel in a first engaged state allowing the second locking projection to be engaged with the first locking projection on a lower side of the first locking projection.

* * * * *